(12) United States Patent
Xu et al.

(10) Patent No.: US 11,947,213 B2
(45) Date of Patent: Apr. 2, 2024

(54) LIQUID CRYSTAL DISPLAY PANEL AND VEHICLE-MOUNTED LIQUID CRYSTAL DISPLAY DEVICE

(71) Applicant: WUHAN CHINA STAR OPTOELECTRONICS TECHNOLOGY CO., LTD., Hubei (CN)

(72) Inventors: Li Xu, Hubei (CN); Yang Yu, Hubei (CN); Song Li, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/620,666

(22) PCT Filed: Nov. 25, 2021

(86) PCT No.: PCT/CN2021/133121
§ 371 (c)(1),
(2) Date: Dec. 17, 2021

(87) PCT Pub. No.: WO2023/082343
PCT Pub. Date: May 19, 2023

(65) Prior Publication Data
US 2024/0045262 A1    Feb. 8, 2024

(30) Foreign Application Priority Data
Nov. 15, 2021   (CN) .......................... 202111350140.8

(51) Int. Cl.
*G02F 1/1335*    (2006.01)
*G02F 1/1333*    (2006.01)
(Continued)

(52) U.S. Cl.
CPC .. *G02F 1/133553* (2013.01); *G02F 1/133345* (2013.01); *G02F 1/133512* (2013.01);
(Continued)

(58) Field of Classification Search
CPC ............... G02F 2201/50; G02F 1/1362; G02F 1/134309; G02F 1/133528;
(Continued)

(56) References Cited

U.S. PATENT DOCUMENTS

2017/0185202 A1    6/2017  Qu
2019/0079236 A1    3/2019  Hung
(Continued)

FOREIGN PATENT DOCUMENTS

| CN | 113495378 A | 10/2021 |
| JP | 2010049479 A | 3/2010 |
| WO | 2018216545 A1 | 11/2018 |

OTHER PUBLICATIONS

Japanese Office Action issued in corresponding Japanese Patent Application No. 特願 2021-572054 dated Jan. 29, 2024, pp. 1-7.

*Primary Examiner* — Mariam Qureshi
(74) *Attorney, Agent, or Firm* — PV IP PC; Wei Te Chung; Zhigang Ma (57) ABSTRACT

A liquid crystal display panel and a vehicle-mounted liquid crystal display device are provided. In the liquid crystal display panel, in an array substrate and/or a color filter substrate, a number of reflective interfaces in a functional area is greater than a number of reflective interfaces in a display area. Under the condition that an infrared optical transmittance is not affected, a reflectivity of light in the functional area is improved compared to the display area. This reduces or even eliminates a brightness difference between the functional area and the display area when a display is completely black.

20 Claims, 4 Drawing Sheets

(51) Int. Cl.
*G02F 1/1343* (2006.01)
*G02F 1/1362* (2006.01)

(52) U.S. Cl.
CPC .. *G02F 1/133514* (2013.01); *G02F 1/133528* (2013.01); *G02F 1/134309* (2013.01); *G02F 1/1362* (2013.01); *G02F 2201/50* (2013.01)

(58) Field of Classification Search
CPC ......... G02F 1/133514; G02F 1/133512; G02F 1/133345; G02F 1/133553
See application file for complete search history.

(56) References Cited

U.S. PATENT DOCUMENTS

2019/0089880 A1\* 3/2019 Murao .................... H04N 23/57
2023/0073217 A1\* 3/2023 Matsuno ................. G02B 5/30

\* cited by examiner

LIQUID CRYSTAL DISPLAY PANEL AND VEHICLE-MOUNTED LIQUID CRYSTAL DISPLAY DEVICE

FIELD OF INVENTION

The present application relates to the field of display technologies, and more particularly to a liquid crystal display panel and a vehicle-mounted liquid crystal display device.

BACKGROUND OF INVENTION

With the development of display technologies and requirements of safe driving, existing vehicles will be equipped with DMS (driver monitor system). The driver's status can be monitored by setting active infrared sensors and mobile phone infrared light information on a vehicle. Specifically, in order to hide an infrared camera and lower holes, the infrared camera is set under a liquid crystal display screen. By digging holes in the liquid crystal display screen, a normal operation of the infrared camera is realized. A current liquid crystal display screen with infrared camera will remove film layers in a color filter substrate and an array substrate by digging a blind hole to improve a transmittance of infrared light. However, in a setting area of the infrared camera, multiple layers of the liquid crystal display are removed, resulting in a difference between a reflectivity of light in the setting area of the infrared camera and a reflectivity of light in a display area. There will be a difference in a brightness of the liquid crystal display screen, which will result in the phenomenon of not being able to reach full black.

Therefore, the current liquid crystal display screen has the technical problem that a total black display cannot be realized due to the difference in the reflectivity of the light in the setting area of the infrared camera compared to the display area.

Technical Problem

The embodiments of the present application provide a liquid crystal display panel and a vehicle-mounted liquid crystal display device used to alleviate the technical problem that the current liquid crystal display screen cannot achieve a black display caused by the difference in the reflectivity of the light in the setting area of the infrared camera compared with the display area.

SUMMARY OF INVENTION

In order to solve the above problems, the technical solutions provided by this application are as follows:

An embodiment of the present application provides a liquid crystal display panel. The liquid crystal display panel comprises a display area and a functional area configured to transmit infrared light, wherein the liquid crystal display panel comprises: an array substrate comprising a plurality of insulating layers; a color filter substrate arranged opposite to the array substrate and comprising a plurality of insulating layers; wherein in the array substrate and/or the color filter substrate, a number of reflective interfaces formed by adjacent insulating layers of different refractive indices located in the functional area is greater than a number of adjacent reflective interfaces with different refractive indices located in the display area, and an absolute value of a difference in refractive indices of adjacent insulating layers on both sides of the reflective interface is greater than or equal to a first preset threshold.

In some embodiments, in the color filter substrate, the plurality of insulating layers comprise a first substrate and a protective layer, in at least one of a side of the first substrate close to the protective layer and a side of the first substrate away from the protective layer, a number of reflective interfaces formed by adjacent insulating layers of different refractive indices located in the functional area is greater than a number of reflective interfaces formed by adjacent insulating layers of different refractive indices located in the display area.

In some embodiments, the color filter substrate further comprises a black matrix arranged between the first substrate and the protective layer, the black matrix is provided with a corresponding first opening in the functional area, and the first opening covers at least the functional area; in the color filter substrate, the plurality of insulating layers further comprises an infrared light-transmitting layer disposed in the functional area and located between the first substrate and the protective layer, an absolute value of a difference in refractive indices between the infrared light-transmitting layer and an adjacent insulating layer thereof is greater than or equal to the first preset threshold.

In some embodiments, the liquid crystal display panel comprises a plurality of display pixels arranged in the display area, and the black matrix is provided with a second opening corresponding to the display pixel; the plurality of insulating layers further comprise a color resist layer disposed at the first opening and the second opening, and an absolute value of a difference in refractive indices between the color resist layer and an adjacent insulating layer thereof is greater than or equal to the first preset threshold; the infrared light-transmitting layer is arranged between the color resist layer and the first substrate, or the infrared light-transmitting layer is arranged between the color resist layer and the protective layer.

In some embodiments, in the display area, the color resist layer comprises a plurality of color resist blocks corresponding to colors of display pixels; in the functional area, the color resist layer comprises at least two stacked layers of color resist sub-layers with different colors passing through, an absolute value of a difference in refractive indices of the color resist sub-layers with different colors passing through is less than or equal to a second preset threshold, and the second preset threshold is less than the first preset threshold.

In some embodiments, the infrared light-transmitting layer comprises a first inorganic layer and a second inorganic layer that are stacked; an absolute value of a difference in refractive indices between the first inorganic layer and an adjacent insulating layer thereof is greater than or equal to the first preset threshold; an absolute value of a difference in refractive indices between the second inorganic layer and an adjacent insulating layer thereof is greater than or equal to the first preset threshold.

In some embodiments, in the color filter substrate, the plurality of insulating layers further comprise a high resistance layer disposed on a side of the first substrate away from the protective layer; the high resistance layer comprises a first high resistance area located in the functional area and a second high resistance area located in the display area, refractive indices of the high resistance layer in the first high resistance area and the second high resistance area are different; an absolute value of a difference between the refractive index of the high resistance layer in the first high resistance area and the refractive index of the first substrate is greater than or equal to the first preset threshold; an absolute value of a difference between the refractive index of the high resistance layer in the second high resistance area and the refractive index of the first substrate is greater than or equal to a second preset threshold, and the second preset threshold is less than the first preset threshold.

In some embodiments, the liquid crystal display panel further comprises a first polarizer arranged on a side of the array substrate away from the color filter substrate and a second polarizer arranged on a side of the color filter substrate away from the array substrate; the high resistance layer is disposed between the first substrate and the second polarizer.

In some embodiments, in the array substrate, the plurality of insulating layers comprise a second substrate and a passivation layer, in at least one of a side of the second substrate close to the passivation layer and a side of the second substrate away from the passivation layer, a number of reflective interfaces formed by adjacent insulating layers with different refractive indices located in the functional area is greater than a number of reflective interfaces formed by adjacent insulating layers with different refractive indices located in the display area.

In some embodiments, the array substrate further comprises a metal conductive layer, the metal conductive layer is provided with a corresponding third opening in the functional area, and the third opening at least covers the functional area.

In some embodiments, in the array substrate, the plurality of insulating layers further comprise a buffer layer, a gate insulating layer, and an interlayer insulating layer that are sequentially stacked between the second substrate and the passivation layer, the buffer layer extends from the display area to the functional area, the gate insulating layer extends from the display area to the functional area, and the interlayer insulating layer extends from the display area to the functional area; the metal conductive layer comprises a first electrode layer and a second electrode layer disposed on both sides of the passivation layer, and the passivation layer is in direct contact with a planarization layer in the functional area.

Further, an embodiment of the present application provides a vehicle-mounted liquid crystal display device. The vehicle-mounted liquid crystal display device comprises a liquid crystal display panel comprising a display area and a functional area configured to transmit infrared light, wherein the liquid crystal display panel comprises an array substrate and a color filter substrate, the array substrate comprises a plurality of insulating layers, the color filter substrate is arranged opposite to the array substrate and comprises a plurality of insulating layers, wherein in the array substrate and/or the color filter substrate, a number of reflective interfaces formed by adjacent insulating layers of different refractive indices located in the functional area is greater than a number of adjacent reflective interfaces with different refractive indices located in the display area, and an absolute value of a difference in refractive indices of adjacent insulating layers on both sides of the reflective interface is greater than or equal to a first preset threshold; an infrared camera arranged on a side of the array substrate away from the color filter substrate, and the infrared camera arranged on the functional area.

In some embodiments, in the color filter substrate, the plurality of insulating layers comprise a first substrate and a protective layer, in at least one of a side of the first substrate close to the protective layer and a side of the first substrate away from the protective layer, a number of reflective interfaces formed by adjacent insulating layers of different refractive indices located in the functional area is greater than a number of reflective interfaces formed by adjacent insulating layers of different refractive indices located in the display area.

In some embodiments, the color filter substrate further comprises a black matrix arranged between the first substrate and the protective layer, the black matrix is provided with a corresponding first opening in the functional area, and the first opening covers at least the functional area; in the color filter substrate, the plurality of insulating layers further comprises an infrared light-transmitting layer disposed in the functional area and located between the first substrate and the protective layer, an absolute value of a difference in refractive indices between the infrared light-transmitting layer and an adjacent insulating layer thereof is greater than or equal to the first preset threshold.

In some embodiments, the liquid crystal display panel comprises a plurality of display pixels arranged in the display area, and the black matrix is provided with a second opening corresponding to the display pixel; the plurality of insulating layers further comprise a color resist layer disposed at the first opening and the second opening, and an absolute value of a difference in refractive indices between the color resist layer and an adjacent insulating layer thereof is greater than or equal to the first preset threshold; the infrared light-transmitting layer is arranged between the color resist layer and the first substrate, or the infrared light-transmitting layer is arranged between the color resist layer and the protective layer.

In some embodiments, in the display area, the color resist layer comprises a plurality of color resist blocks corresponding to colors of display pixels; in the functional area, the color resist layer comprises at least two stacked layers of color resist sub-layers with different colors passing through, an absolute value of a difference in refractive indices of the color resist sub-layers with different colors passing through is less than or equal to a second preset threshold, and the second preset threshold is less than the first preset threshold.

In some embodiments, the infrared light-transmitting layer comprises a first inorganic layer and a second inorganic layer that are stacked; an absolute value of a difference in refractive indices between the first inorganic layer and an adjacent insulating layer thereof is greater than or equal to the first preset threshold; an absolute value of a difference in refractive indices between the second inorganic layer and an adjacent insulating layer thereof is greater than or equal to the first preset threshold.

In some embodiments, in the color filter substrate, the plurality of insulating layers further comprise a high resistance layer disposed on a side of the first substrate away from the protective layer; the high resistance layer comprises a first high resistance area located in the functional area and a second high resistance area located in the display area, refractive indices of the high resistance layer in the first high resistance area and the second high resistance area are different; an absolute value of a difference between the refractive index of the high resistance layer in the first high resistance area and the refractive index of the first substrate is greater than or equal to the first preset threshold; an absolute value of a difference between the refractive index of the high resistance layer in the second high resistance area and the refractive index of the first substrate is greater than or equal to a second preset threshold, and the second preset threshold is less than the first preset threshold.

In some embodiments, the liquid crystal display panel further comprises a first polarizer arranged on a side of the array substrate away from the color filter substrate and a second polarizer arranged on a side of the color filter substrate away from the array substrate; the high resistance layer is disposed between the first substrate and the second polarizer.

In some embodiments, in the array substrate, the plurality of insulating layers comprise a second substrate and a passivation layer, in at least one of a side of the second substrate close to the passivation layer and a side of the second substrate away from the passivation layer, a number of reflective interfaces formed by adjacent insulating layers with different refractive indices located in the functional area is greater than a number of reflective interfaces formed by adjacent insulating layers with different refractive indices located in the display area.

Beneficial Effect:

The present application provides a liquid crystal display panel and a vehicle-mounted liquid crystal display device. The liquid crystal display panel comprises a display area and a functional area configured to transmit infrared light, wherein the liquid crystal display panel comprises: an array substrate comprising a plurality of insulating layers; a color filter substrate arranged opposite to the array substrate and comprising a plurality of insulating layers; wherein in the array substrate and/or the color filter substrate, a number of reflective interfaces formed by adjacent insulating layers of different refractive indices located in the functional area is greater than a number of adjacent reflective interfaces with different refractive indices located in the display area, and an absolute value of a difference in refractive indices of adjacent insulating layers on both sides of the reflective interface is greater than or equal to a first preset threshold. In this application, in the array substrate and/or color filter substrate, the number of reflective interfaces formed by adjacent insulating layers with different refractive indices in the functional area is greater than the number of adjacent reflective interfaces with different refractive indices in the display area. Because the reflectance of the liquid crystal display panel is superimposed by the reflectance of each film layer, the present application does not affect the infrared optical transmittance by making the number of reflective interfaces in the functional area larger than the number of reflective interfaces in the display area. In the display area, the reflectivity of the light in the functional area is improved. This reduces or even eliminates the brightness difference between the functional area and the display area when the display is completely black.

DESCRIPTION OF DRAWINGS

The technical solutions and other beneficial effects of the present application will be made obvious by describing the specific implementation manners of the present application in detail below in conjunction with the accompanying drawings.

DETAILED DESCRIPTION OF PREFERRED EMBODIMENTS

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

In view of the technical problem of inability to achieve full black display due to a different reflectivity of light in a setting area of an infrared camera compared to a display area in a current liquid crystal display screen, an embodiment of the present application provides a liquid crystal display panel and a vehicle-mounted liquid crystal display device to solve the above technical problems.

Figure 1:
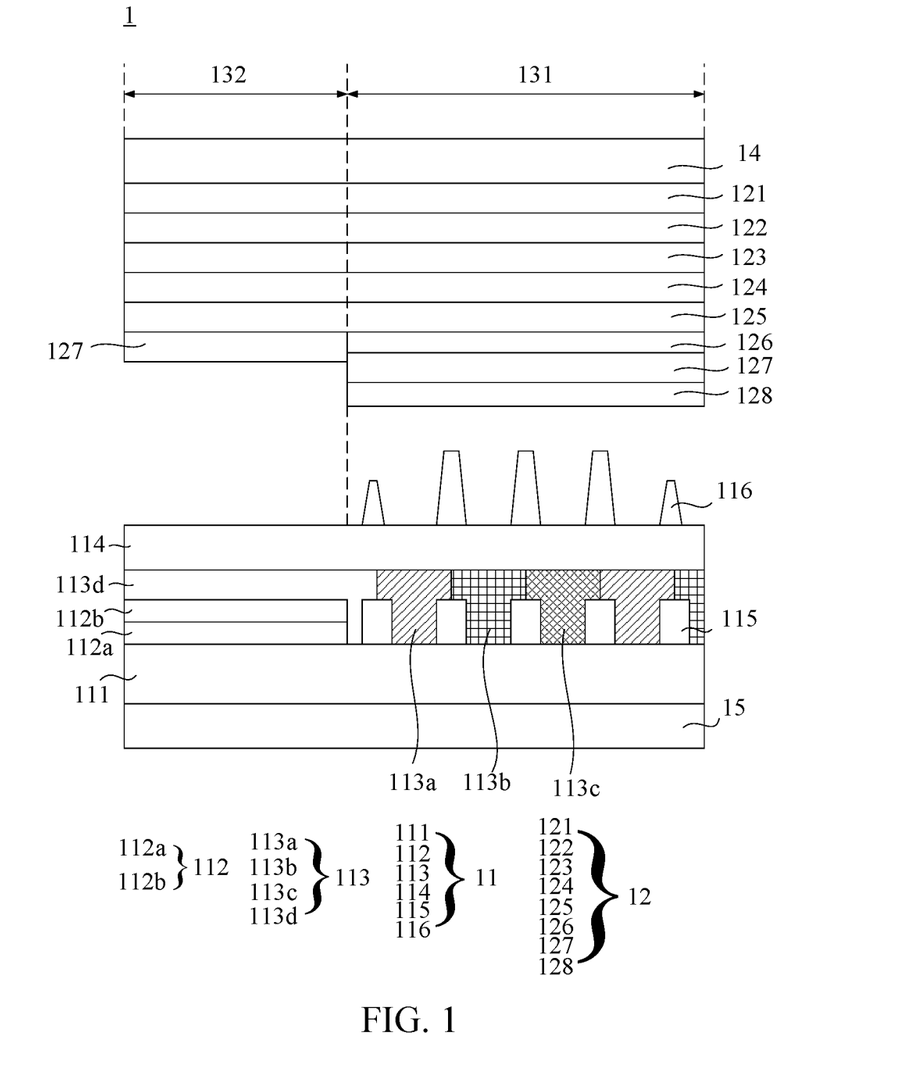
FIG. 1 is a schematic diagram of a liquid crystal display panel provided by an embodiment of the present application.

As shown in FIG. 1, an embodiment of the present application provides a liquid crystal display panel. The liquid crystal display panel 1 includes a display area 131 and a functional area 132 that transmits infrared light. The liquid crystal display panel 1 includes the following.

An array substrate 12 includes a plurality of insulating layers (for example, a second substrate 121).

A color filter substrate 11 is disposed opposite to the array substrate 12 and includes a plurality of insulating layers (for example, a first substrate 111).

In the array substrate 12 and/or the color filter substrate 11, a number of reflective interfaces formed by adjacent insulating layers of different refractive indices located in the functional area 132 is greater than a number of adjacent reflective interfaces with different refractive indices located in the display area 131, and an absolute value of a difference in refractive indices of adjacent insulating layers on both sides of the reflective interface is greater than or equal to a first preset threshold.

An embodiment of the application provides a liquid crystal display panel. In the array substrate and/or color filter substrate, the number of reflective interfaces formed by adjacent insulating layers with different refractive indices in the functional area is greater than the number of adjacent reflective interfaces with different refractive indices in the display area. Because the reflectance of the liquid crystal display panel is superimposed by the reflectance of each film layer, the present application does not affect the infrared optical transmittance by making the number of reflective interfaces in the functional area larger than the number of reflective interfaces in the display area. In the display area, the reflectivity of the light in the functional area is improved. This reduces or even eliminates the brightness difference between the functional area and the display area when the display is completely black.

It should be noted that in the embodiments of the present application, the insulating layer refers to a common electrode layer and a pixel electrode layer formed of ITO (indium tin oxide) or a common electrode layer and a pixel electrode layer formed of other conductive materials, and an inorganic film layer and an organic film layer of a semiconductor active layer. Specifically, the black matrix is due to light absorption. Therefore, the insulating layer defined in the embodiment of the present application does not include a black matrix.

It should be noted that the reflective interface refers to the interface between adjacent insulating layers with different refractive indices that reflects visible light, and the absolute value of the difference in refractive index of the adjacent insulating layers on both sides of the reflective interface is greater than or equal to the first preset threshold. For example, in the display area, as shown in FIG. 1, an absolute value of a difference between the refractive index of the first substrate 111 and a color resist layer 113 is greater than or equal to the first preset threshold. The interface between the first substrate 111 and the color resist layer 113 is a reflective interface. A black matrix 115 absorbs light and does not reflect light, therefore the interface between the black matrix 115 and the first substrate 111 is not a reflective interface. Further, the absolute value of the difference between the refractive index of the color resist layer 113 and a protective layer 114 is greater than or equal to the first preset threshold. The interface between the color resist layer 113 and the protective layer 114 is a reflective interface. A support column 116 is disposed in an area corresponding to the black matrix 115, no light or less light will diverge between the support column 116 and the protective layer 114, with less or no reflection. The support columns 116 are arranged at intervals without a complete interface, which further reduces the reflected light or even no reflected light. Therefore, there is no reflective interface between the support columns and the protective layer. From the above analysis, it can be known that in the current liquid crystal display panel, the number of reflective interfaces located in the display area on the color filter substrate is two.

It should be noted that the first preset threshold refers to when the refractive index of two adjacent film layers is greater than a threshold, the interface between the two adjacent film layers will produce reflection or larger emission. Further, the interface between two adjacent insulating layers can be used as a reflective interface. For example, the color resist layer will include multiple color resists that transmit light of different colors. The difference in refractive index between the multiple color resistors that transmits light of different colors is small or even the same, for example, less than or equal to 0.01. The interface between two layers of color resist basically does not reflect light. Therefore, two layers of color resist will be used as a whole instead of the interface between the two layers of color resist as a reflective interface. Therefore, when the absolute value of the refractive index difference between adjacent insulating layers is greater than or equal to the first preset threshold, for example, greater than or equal to 0.1 (in actual applications, you can also choose 0.1, 0.2, 0.3, 0, 4, 0.5, etc.), the interface between adjacent insulating layers is a reflective interface. The absolute value of the refractive index difference between adjacent insulating layers is less than or equal to the second preset threshold, and the adjacent insulating layers can be regarded as a whole. When the absolute value of the refractive index difference between adjacent insulating layers is between a second preset threshold and the first preset threshold, the interface between the adjacent insulating layers is not regarded as a reflective interface.

Figure 2:
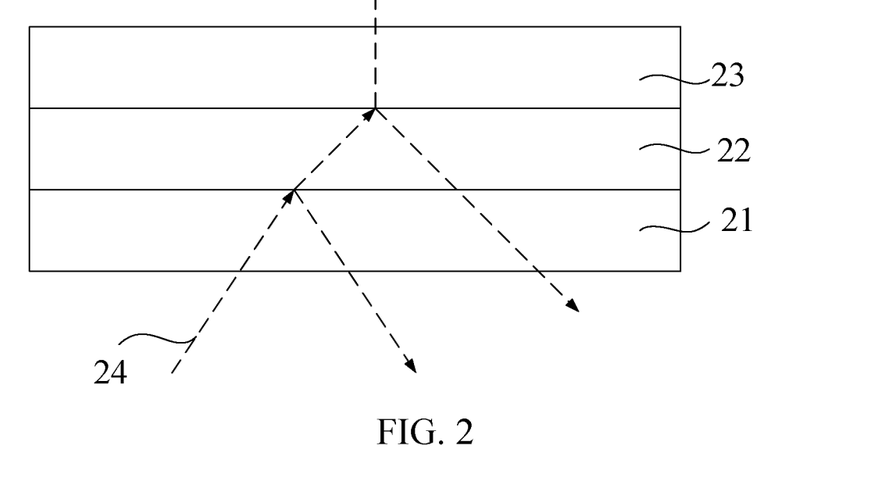
FIG. 2 is a schematic diagram of reflection of light through an insulating layer provided by an embodiment of the present application.

It should be noted that, as shown in FIG. 2, the liquid crystal display device includes a plurality of insulating layers: a first film layer 21, a second film layer 22, and a third film layer 23. When external light 24 is irradiated to the liquid crystal display device, the refractive index of the first film layer 21 is n1, the refractive index of the second film layer 22 is n2, and the refractive index of the third film layer 23 is n3. The reflectivity of the external light 24 at the interface between the first film layer 21 and the second film layer 22 $R1=(n2-n1)^2/(n2+n1)^2$. The reflectivity of the external light 24 at the interface between the second film layer 22 and the third film layer 23 $R2=(n3-n2)^2/(n3+n2)^2$. The reflectivity of the external light of the liquid crystal display device is $R=R1+R2$.

It can be known from the above analysis that, in the embodiment of the present application, the number of reflective interfaces formed by the insulating layers in the functional area is greater than the number of reflective interfaces formed by the insulating layers in the display area in the array substrate and/or the color filter substrate. This improves the reflectivity of the functional area of the liquid crystal display panel to the ambient light, thereby narrowing the difference in the light reflectivity of the functional area and the display area to the ambient light, and improving the brightness uniformity of the liquid crystal display panel when the liquid crystal display panel is completely black.

It should be noted that, in the embodiment of the present application, compared with a current design scheme of an under-screen camera, because a camera area under the current screen needs to transmit visible light to realize a camera function, holes in a camera setting area under the screen are drilled to remove organic and inorganic layers, and this causes the reflectivity of the camera setting area under the screen to the light of the external environment to be different from the reflectivity of the light of the display area. This application takes into account that the infrared camera needs to collect infrared light, and the film layer such as color resist has a higher transmittance of infrared light. Therefore, it is possible to add color resist and other layers in the functional area without affecting the transmission of infrared light. This narrows the gap between the reflected light of the functional area and the display area, and improves the brightness uniformity of the liquid crystal display panel when the liquid crystal display panel is displayed in black.

In an embodiment, in the color filter substrate, a number of reflective interfaces formed by adjacent insulating layers of different refractive indices located in the functional area is greater than a number of reflective interfaces formed by adjacent insulating layers of different refractive indices located in the display area. In the liquid crystal display panel, in order to improve the light transmittance of the camera setting area under the screen, the current liquid crystal display panel removes the color resist and black matrix in the color fitter substrate. The color fitter substrate in the camera setting area under the screen is flattened by other film layers. Therefore, in the embodiment of the present application, the color filter substrate is designed, an insulating layer is arranged in the space formed by the removed color resist and the black matrix, and the reflective interfaces formed by adjacent insulating layers with different refractive indices in the functional area are increased. This makes the number of reflective interfaces formed by adjacent insulating layers with different refractive indices located in the functional area greater than the number of reflective interfaces formed by adjacent insulating layers with different refractive indices located in the display area. Thereby, the light reflectance of the functional area is improved, the gap between the light reflectance of the functional area and the display area is reduced, and the uniformity of the liquid crystal display panel when the liquid crystal display panel is displayed in black is improved.

In one embodiment, as shown in FIG. 1, in the color filter substrate 11, the plurality of insulating layers comprise a first substrate 111 and a protective layer 114, in at least one of a side of the first substrate 111 close to the protective layer 114 and a side of the first substrate 111 away from the protective layer 114, a number of reflective interfaces formed by adjacent insulating layers of different refractive indices located in the functional area 132 is greater than a number of reflective interfaces formed by adjacent insulating layers of different refractive indices located in the display area 131. By increasing the number of reflective interfaces on at least one of the two sides of the first substrate, the reflectivity of the functional area is increased, and the difference between the reflectivity of the functional area and the display area is reduced. Thereby, the brightness uniformity of the liquid crystal display panel when the liquid crystal display panel is displayed in black is improved.

Specifically, taking FIG. 1 as an example, when the refractive indices of a first inorganic layer 112a and a second inorganic layer 112b are different from the adjacent film layers, the reflective interfaces of the functional area include four, and the reflective interfaces of the display area include two. The number of reflective interfaces of the insulating layers with different refractive indices in the functional area is greater than the number of reflective interfaces of the insulating layers of different refractive indices in the display area. This increases the reflectivity of the functional area and narrows the difference between the reflectivity of the functional area and the display area, thereby improving the brightness uniformity of the liquid crystal display panel when the liquid crystal display panel is displayed in black.

For the current display device, the color resist and black matrix will be removed in the camera setting area under the screen, which leads to the problem that there are fewer reflective interfaces in the camera setting area under the screen. In one embodiment, as shown in FIG. 1, the color filter substrate 11 further comprises a black matrix 115 arranged between the first substrate 111 and the protective layer 114, the black matrix 115 is provided with a corresponding first opening in the functional area 132, and the first opening covers at least the functional area 132; in the color filter substrate 11, the plurality of insulating layers further comprises an infrared light-transmitting layer 112 disposed in the functional area 132 and located between the first substrate 111 and the protective layer 114, an absolute value of a difference in refractive indices between the infrared light-transmitting layer 112 and an adjacent insulating layer thereof is greater than or equal to the first preset threshold. When the black matrix is removed in the functional area, in the functional area, an infrared light-transmitting layer is formed by the space between the first substrate and the protective layer. The absolute value of the difference in refractive index between the infrared-transmitting layer and the adjacent insulating layer is greater than or equal to the first preset threshold, then the number of reflective interfaces between the first substrate and the protective layer is increased. This improves the reflectivity of the functional area and narrows the difference between the reflectivity of the functional area and the display area. Thereby, the brightness uniformity of the liquid crystal display panel when the liquid crystal display panel is displayed in black is improved. Because the increased infrared light-transmitting layer is arranged between the first substrate and the protective layer, the thickness of the liquid crystal display panel will not be increased.

Figure 3:
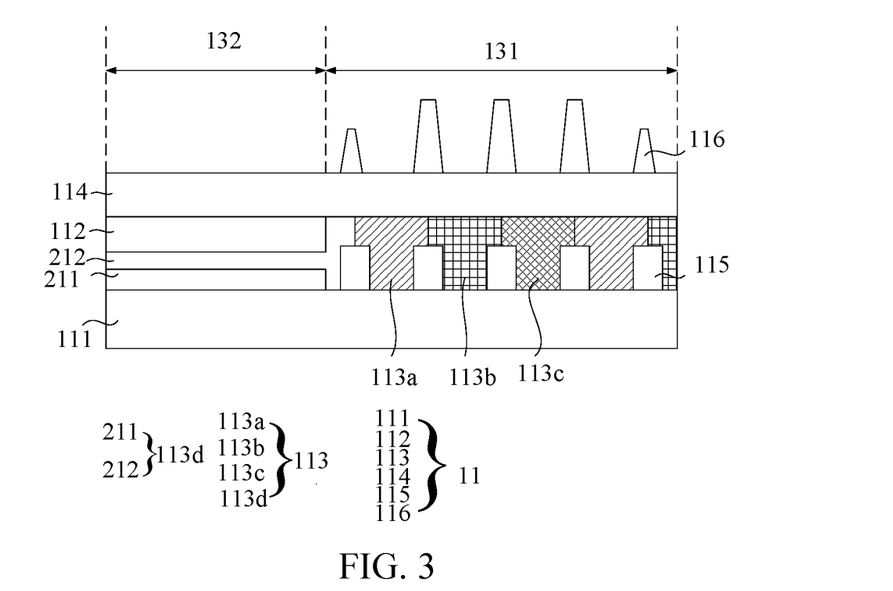
FIG. 3 is a first schematic diagram of a color filter substrate provided by an embodiment of the present application.

In one embodiment, as shown in FIG. 1, the liquid crystal display panel 1 comprises a plurality of display pixels arranged in the display area, and the black matrix 115 is provided with a second opening corresponding to the display pixel; the plurality of insulating layers further comprise a color resist layer 113 disposed at the first opening and the second opening, and an absolute value of a difference in refractive indices between the color resist layer 113 and an adjacent insulating layer thereof is greater than or equal to the first preset threshold; the infrared light-transmitting layer 112 is arranged between the color resist layer 113 and the first substrate 111, or as shown in FIG. 3, the infrared light-transmitting layer 112 is arranged between the color resist layer 113 and the protective layer 114. In the liquid crystal display panel, a color resist layer is set in the display area. The embodiment of the application considers that the transmittance of the color resist to infrared light is relatively high. Therefore, it is possible to form a color resist layer in the display area while forming a color resist layer in the functional area. This increases the number of reflective interfaces in the functional area, improves the reflectivity of the functional area, and narrows the gap between the reflectivity of the functional area and the display area. Therefore, the brightness uniformity of the liquid crystal display panel when the liquid crystal display panel is displayed in all black is improved, and the setting method does not need to increase the process of the liquid crystal display panel, and does not need to increase the thickness of the liquid crystal display panel.

Specifically, the infrared light-transmitting layer is disposed between the color resist layer and the first substrate. In the functional area, a reflective interface can be formed between the first substrate and the infrared-transmitting layer. A reflective interface is formed between the color resist layer and the infrared light-transmitting layer. A reflective interface is formed between the color resist layer and the protective layer. Thereby increasing the reflective interface of the functional area and narrowing the gap between the reflectivity of the functional area and the display area. Thereby, the brightness uniformity of the liquid crystal display panel when the liquid crystal display panel is displayed in black is improved.

Specifically, the infrared light-transmitting layer is arranged between the color resist layer and the protective layer. In the functional area, a reflective interface can be formed between the first substrate and the color resist layer. A reflective interface is formed between the color resist layer and the infrared light-transmitting layer. A reflective interface is formed between the infrared light-transmitting layer and the protective layer. Thereby increasing the reflective interface of the functional area and narrowing the gap between the reflectivity of the functional area and the display area. Thereby, the brightness uniformity of the liquid crystal display panel when the liquid crystal display panel is displayed in black is improved. In practical applications, the infrared light-transmitting layer can be a silicon oxide film with a refractive index of 1.5 and a silicon nitride film with a refractive index of 1.85, or it can be determined according to actual needs, and there is no limitation here.

When the color resist layer that transmits a single color is set in the functional area, it cannot block visible light, which will cause the problem of light leakage in the functional area. In one embodiment, as shown in FIG. 3, in the display area, the color resist layer 113 comprises a plurality of color resist blocks corresponding to colors of display pixels (such as red color block 113a, green color block 113b, blue color block 113c).

In the functional area 132, the color resist layer 113 comprises at least two stacked layers of color resist sub-layers 113*d* (For example, it includes a red color resist sub-layer 211 and a blue color resist sub-layer 212) with different colors passing through, an absolute value of a difference in refractive indices of the color resist sub-layers 113*d* with different colors passing through is less than or equal to a second preset threshold, and the second preset threshold is less than the first preset threshold. Because materials that pass through the color resist sub-layers with different colors are similar, and the refractive index is similar, in the reflection of light, the interface between the two has a low reflectivity to light. Therefore, the two can be regarded as a whole, and the refractive index can also be regarded as a whole, and the interface between the two is not regarded as a reflective interface. By arranging multiple color resist sub-layers in the functional area, the visible light can be blocked without increasing the process of the liquid crystal display panel, and light leakage in the visible light functional area can be avoided.

In order to further improve the reflectivity of the functional area, the brightness uniformity of the liquid crystal display panel when the liquid crystal display panel is displayed in black is improved. In one embodiment, as shown in FIG. 1, the infrared light-transmitting layer 112 comprises a first inorganic layer 112*a* and a second inorganic layer 112*b* that are stacked.

An absolute value of a difference in refractive indices between the first inorganic layer 112*a* and an adjacent insulating layer thereof is greater than or equal to the first preset threshold.

An absolute value of a difference in refractive indices between the second inorganic layer 112*b* and an adjacent insulating layer thereof is greater than or equal to the first preset threshold. The infrared light-transmitting layer is provided as a first inorganic layer and a second inorganic layer. The absolute value of the refractive index difference between the first inorganic layer and the second inorganic layer and the adjacent insulating layer is greater than or equal to the first preset threshold. This further increases the number of reflective interfaces, reduces the difference in reflectivity between the functional area and the display area, thereby improving the brightness uniformity of the liquid crystal display panel when the liquid crystal display panel is displayed in black.

Specifically, as shown in FIG. 1, the first inorganic layer 112*a* is disposed between the first substrate 111 and the second inorganic layer 112*b*. The refractive index of the first inorganic layer 112 a is greater than the refractive index of the first substrate 111. The refractive index of the first inorganic layer 112*a* is greater than the refractive index of the second inorganic layer 112*b*. The refractive index of the second inorganic layer is less than the refractive index of the color resist layer 113, and the absolute value of the refractive index difference between adjacent insulating layers is greater than or equal to the first preset threshold. By setting the refractive index of the insulating layer in the functional area to be staggered, the refractive indices of the two insulating layers in the two adjacent insulating film layers are greatly different. This will not make the refractive index of a single film layer too large, resulting in excessive reflection of light. This increases the number of reflective interfaces and narrows the difference in reflectivity between the functional area and the display area. Thereby, the brightness uniformity of the liquid crystal display panel when the liquid crystal display panel is displayed in black is improved.

The foregoing embodiments have been described in detail by taking the first inorganic layer and the second inorganic layer in the infrared light-transmitting layer disposed between the first substrate and the color resist layer as an example, but the embodiments of the present application are not limited to this, and the first inorganic layer and the second inorganic layer can also be arranged separately or adjacently arranged in other positions.

The foregoing embodiments describe in detail the manner in which the color resist layer and the infrared light-transmitting layer are added to increase the reflective interface, but the embodiments of the present application are not limited to this. For example, only the infrared light-transmitting layer is provided, so that the infrared light-transmitting layer includes multiple film layers. The absolute value of the refractive index difference between any one of the multiple film layers and the adjacent insulating layer is greater than or equal to the first preset threshold. Alternatively, a plurality of infrared light-transmitting layers are provided, so that the absolute value of the refractive index difference between each infrared light-transmitting layer and the adjacent insulating layer is greater than or equal to the first preset threshold.

Figure 4:
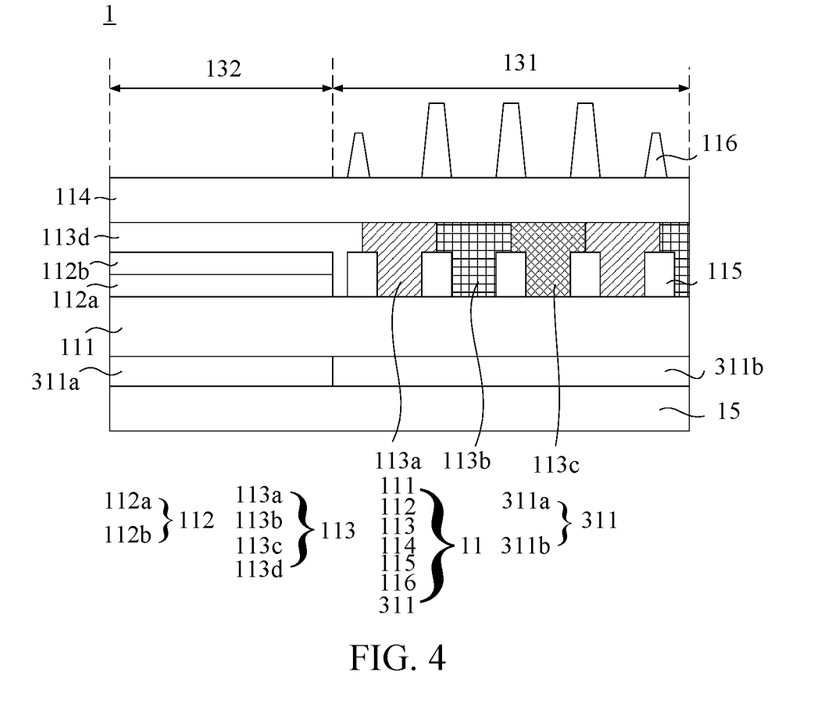
FIG. 4 is a second schematic diagram of a color filter substrate provided by an embodiment of the present application.

The foregoing embodiment has been described in detail by taking the addition of a reflective interface between the first substrate and the protective layer as an example, but the embodiment of the present application is not limited to this. In one embodiment, as shown in FIG. 4, in the color filter substrate 11, the plurality of insulating layers further comprise a high resistance layer 311 disposed on a side of the first substrate 111 away from the protective layer 114.

The high resistance layer 311 comprises a first high resistance area 311*a* located in the functional area 132 and a second high resistance area 311*b* located in the display area 131, refractive indices of the high resistance layer 311 in the first high resistance area 311*a* and the second high resistance area 311*b* are different.

An absolute value of a difference between the refractive index of the high resistance layer 311 in the first high resistance area 311*a* and the refractive index of the first substrate 111 is greater than or equal to the first preset threshold.

An absolute value of a difference between the refractive index of the high resistance layer 311 in the second high resistance area 311*b* and the refractive index of the first substrate 111 is greater than or equal to a second preset threshold, and the second preset threshold is less than the first preset threshold. A high resistance layer is provided on the side of the first substrate away from the protective layer. The absolute value of the refractive index difference between the first high resistance area of the high resistance layer and the first substrate is greater than or equal to the first preset threshold. The absolute value of the refractive index difference of the first substrate in the second high resistance area is less than or equal to the second preset threshold. This increases the number of reflective interfaces in the functional area. In addition, the display area is flattened, which narrows the difference in reflectivity between the functional area and the display area. Thereby, the brightness uniformity of the liquid crystal display panel when the liquid crystal display panel is displayed in black is improved.

In an embodiment, as shown in FIG. 1 and FIG. 4, the liquid crystal display panel 1 further comprises a first polarizer 14 arranged on a side of the array substrate 12 away from the color filter substrate 11 and a second polarizer 15 arranged on a side of the color filter substrate 11 away from the array substrate 12.

The high resistance layer 311 is disposed between the first substrate 111 and the second polarizer 15 By disposing the high resistance layer between the first substrate and the second polarizer, damage to the high resistance layer is avoided.

Specifically, the refractive index difference between the first high resistance region and the second high resistance region of the high resistance layer can be formed by doping.

The above-mentioned embodiments are described in detail by taking the different refractive indicis of the first high resistance area and the second high resistance area of the high resistance layer as an example. However, the embodiments of the present application are not limited to this, and high resistance layers with different refractive indicis may be formed in the functional area and the display area respectively.

The foregoing embodiment has been described in detail by taking the high-resistance layer provided between the first substrate and the second polarizer as an example. However, the embodiments of the present application are not limited to this, and the high resistance layer may also be disposed on the side of the second polarizer away from the first substrate.

In one embodiment, as shown in FIG. 1, the array substrate 12 further comprises a metal conductive layer (such as the first electrode layer 126 and the second electrode layer 128), the metal conductive layer is provided with a corresponding third opening in the functional area 132, and the third opening at least covers the functional area 132. By removing the metal layer in the functional area, the infrared light transmittance of the functional area is improved.

For the current liquid crystal display device, the film layer of the array substrate located in the functional area is dug to increase the light transmittance, resulting in uneven brightness caused by the difference in light reflectivity between the functional area and the display area. In one embodiment, as shown in FIG. 1, in the array substrate 12, the plurality of insulating layers further include a buffer layer 122, a gate insulating layer 123, an interlayer insulating layer 124, and a planarization layer 125 that are sequentially stacked between the second substrate 121 and the passivation layer 127. The buffer layer 122 extends from the display area 131 to the functional area 132, the gate insulating layer 123 extends from the display area 131 to the functional area 132, and the interlayer insulating layer 124 extends from the display area. 131 extends to the functional area 132.

The metal conductive layer comprises a first electrode layer 126 and a second electrode layer 128 disposed on both sides of the passivation layer 127, and the passivation layer 127 is in direct contact with the planarization layer 125 in the functional area 132. For the current liquid crystal display panel, the film layer of the functional area will be removed, resulting in low reflectivity of the functional area. This application increases the number of reflective interfaces in the functional area, improves the reflectivity of the functional area, and narrows the gap between the reflectivity of the functional area and the display area by retaining or increasing the film layer of the functional area, thereby, the brightness uniformity of the liquid crystal display panel when the liquid crystal display panel is displayed in black is improved.

It should be noted that at least most areas of the passivation layer and the planarization layer in the display area are not in direct contact. Therefore, the number of reflective interfaces formed by adjacent insulating layers in the functional area is greater than the number of reflective interfaces formed by adjacent insulating layers in the display area.

In one embodiment, in the array substrate, between the passivation layer and the second substrate and/or the side of the passivation layer away from the second substrate, and/or the side of the second substrate away from the passivation layer, and the plurality of insulating layers further include a transparent layer. The absolute value of the refractive index difference between the transparent layer and the adjacent insulating layer is greater than or equal to the first preset threshold. That is, by adding the transparent layer in the array substrate, the number of reflective interfaces in the functional area is further increased. Thereby, the reflectance of the functional area is increased, and the difference between the reflectance of the functional area and the display area is reduced, thereby improving the brightness uniformity of the liquid crystal display panel when the liquid crystal display panel is displayed in black.

Specifically, the following table illustrates the theoretical data of the reflectance of the functional area in the embodiment of the present application.

TABLE 1

Reflectivity of each reflective interface of the array substrate

| Insulating layer of array substrate | Refractive index | Theoretical reflectivity of adjacent insulating layers |
|---|---|---|
| Passivation layer | 1.85 | 0.779% |
| Planarization layer | 1.55 | 0.070% |
| Silicon oxide layer in the interlayer insulating layer | 1.47 | 1.434% |
| Silicon nitride layer in interlayer insulating layer | 1.87 | 1.600% |
| Gate insulating layer | 1.45 | 0.019% |
| Silicon oxide layer in buffer layer | 1.49 | 1.279% |
| Silicon nitride layer in buffer layer | 1.87 | 1.134% |
| Second substrate | 1.21 | |

It should be noted that the second substrate itself does not form a reflective interface. Therefore, the reflectivity of the reflective interface formed by the second substrate and the silicon nitride layer in the buffer layer is described in the column of the silicon nitride layer in the buffer layer. The reflective interface represented by other values of reflectivity is as described above. As can be seen from Table 1 above, in the functional area, compared with the current reflectivity of the functional area on the array substrate side after the film is removed, the reflectivity of the functional area is increased to 6.28% in this application, which improves the reflectivity of the functional area. It should be noted that the difference in refractive index between the gate insulating layer and the silicon oxide layer in the buffer layer is not too large (0.04), and is smaller than the first preset threshold (greater than or equal to 0.1). The contact between them contributes little to the reflectivity of the external ambient light, and the contact surface between them may not be regarded as the reflective interface mentioned above.

TABLE 2

Reflectivity of each reflective interface of the color fifter substrate

| Insulating layer of color filter substrate | Refractive index | Theoretical reflectivity of adjacent insulating layers |
|---|---|---|
| Protective layer | 1.5 | 0.39% |
| Color resist layer | 1.7 | 0.43% |
| Silicon oxide layer in infrared light-transmitting layer | 1.5 | 1.09% |

TABLE 2-continued

Reflectivity of each reflective interface of the color filter substrate

| Insulating layer of color filter substrate | Refractive index | Theoretical reflectivity of adjacent insulating layers |
|---|---|---|
| Silicon nitride layer in infrared light-transmitting layer | 1.85 | 1.02% |
| First substrate | 1.51 | |

It should be noted that the first substrate itself does not form a reflective interface. Therefore, the reflectance of the reflective interface formed by the first substrate and the silicon nitride layer in the infrared light-transmitting layer is described in the column of the silicon nitride layer in the infrared light-transmitting layer. The reflective interface represented by other values of reflectivity is as described above. From Table 2 above, it can be seen that in the functional area, the reflectance of the functional area on the side of the color filter substrate is 0.78% compared to the current color filter substrate side after the film layer is removed. In this application, the reflectivity is increased to 2.90%, which improves the reflectivity of the functional area to external ambient light.

Figure 5:
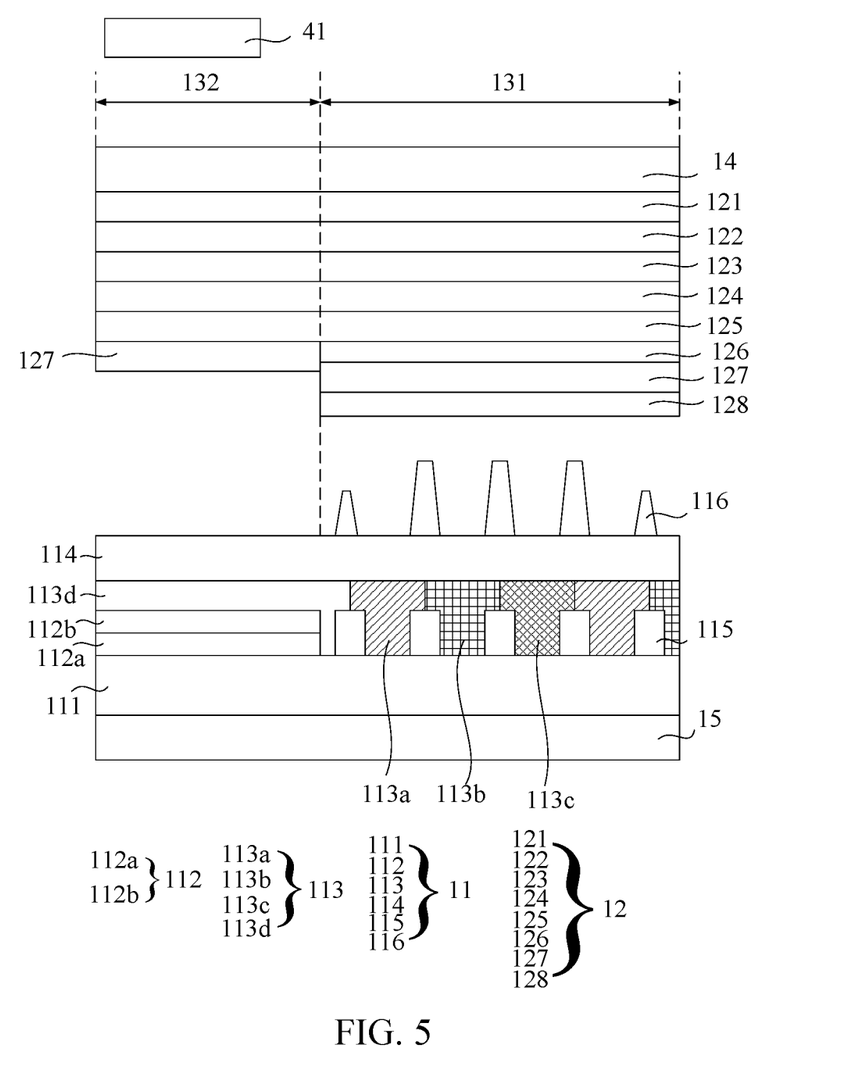
FIG. 5 is a schematic diagram of a vehicle-mounted liquid crystal display device provided by an embodiment of the present application.

Further, as shown in FIG. 5, an embodiment of the present application provides a vehicle-mounted liquid crystal display device. The vehicle-mounted liquid crystal display device comprises the following.

A liquid crystal display panel comprises a display area 131 and a functional area 132 configured to transmit infrared light, wherein the liquid crystal display panel comprises an array substrate 12 and a color filter substrate 11, the array substrate 12 comprises a plurality of insulating layers (such as second substrate 121), the color filter substrate 11 is arranged opposite to the array substrate 12 and comprises a plurality of insulating layers (such as first substrate 111), wherein in the array substrate 12 and/or the color filter substrate 11, a number of reflective interfaces formed by adjacent insulating layers of different refractive indices located in the functional area 132 is greater than a number of adjacent reflective interfaces with different refractive indices located in the display area 131, and an absolute value of a difference in refractive indices of adjacent insulating layers on both sides of the reflective interface is greater than or equal to a first preset threshold.

An infrared camera 41 is arranged on a side of the array substrate 12 away from the color filter substrate 11, and the infrared camera 41 is arranged on the functional area 132.

The backlight module (not shown in the figure) is arranged on the side of the array substrate 12 away from the color filter substrate 11, the corresponding functional area 132 of the backlight module can be provided with openings, and the infrared camera 41 can be inserted into the opening of the backlight module.

It should be noted that the liquid crystal display panel used in the vehicle-mounted liquid crystal display device is the liquid crystal display panel described above, and its specific structure has been described in detail above, and will not be repeated here.

According to the Above Embodiments:

The present application provides a liquid crystal display panel and a vehicle-mounted liquid crystal display device. The liquid crystal display panel comprises a display area and a functional area configured to transmit infrared light, wherein the liquid crystal display panel comprises: an array substrate comprising a plurality of insulating layers; a color filter substrate arranged opposite to the array substrate and comprising a plurality of insulating layers; wherein in the array substrate and/or the color filter substrate, a number of reflective interfaces formed by adjacent insulating layers of different refractive indices located in the functional area is greater than a number of adjacent reflective interfaces with different refractive indices located in the display area, and an absolute value of a difference in refractive indices of adjacent insulating layers on both sides of the reflective interface is greater than or equal to a first preset threshold. In this application, in the array substrate and/or color filter substrate, the number of reflective interfaces formed by adjacent insulating layers with different refractive indices in the functional area is greater than the number of adjacent reflective interfaces with different refractive indices in the display area. Because the reflectance of the liquid crystal display panel is superimposed by the reflectance of each film layer, the present application does not affect the infrared optical transmittance by making the number of reflective interfaces in the functional area larger than the number of reflective interfaces in the display area. In the display area, the reflectivity of the light in the functional area is improved. This reduces or even eliminates the brightness difference between the functional area and the display area when the display is completely black.

In the above-mentioned embodiments, the description of each embodiment has its own emphasis. For parts that are not described in detail in an embodiment, reference may be made to related descriptions of other embodiments.

The liquid crystal display panel and the vehicle-mounted liquid crystal display device provided by the embodiments of the present application have been described in detail above. Specific examples are used in this article to illustrate the principle and implementation of this application. The descriptions of the above embodiments are only used to help understand the technical solutions and core ideas of the present application. Those of ordinary skill in the art should understand that they can still modify the technical solutions described in the foregoing embodiments. Or equivalently replace some of the technical features. However, these modifications or replacements do not cause the essence of the corresponding technical solutions to deviate from the scope of the technical solutions of the embodiments of the present application.

What is claimed is:

1. A liquid crystal display panel comprising a display area and a functional area configured to transmit infrared light, wherein the liquid crystal display panel comprises:
   an array substrate comprising a plurality of insulating layers;
   a color filter substrate arranged opposite to the array substrate and comprising a plurality of insulating layers;
   wherein in the array substrate and/or the color filter substrate, a number of reflective interfaces formed by adjacent insulating layers of different refractive indices located in the functional area is greater than a number of adjacent reflective interfaces with different refractive indices located in the display area, and an absolute value of a difference in refractive indices of adjacent insulating layers on both sides of the reflective interface is greater than or equal to a first preset threshold.

2. The liquid crystal display panel according to claim 1, wherein in the color filter substrate, the plurality of insulating layers comprise a first substrate and a protective layer, in at least one of a side of the first substrate close to the protective layer and a side of the first substrate away from the protective layer, a number of reflective interfaces formed by adjacent insulating layers of different refractive indices located in the functional area is greater than a number of reflective interfaces formed by adjacent insulating layers of different refractive indices located in the display area.

3. The liquid crystal display panel according to claim 2, wherein the color filter substrate further comprises a black matrix arranged between the first substrate and the protective layer, the black matrix is provided with a corresponding first opening in the functional area, and the first opening covers at least the functional area;

in the color filter substrate, the plurality of insulating layers further comprises an infrared light-transmitting layer disposed in the functional area and located between the first substrate and the protective layer, an absolute value of a difference in refractive indices between the infrared light-transmitting layer and an adjacent insulating layer thereof is greater than or equal to the first preset threshold.

4. The liquid crystal display panel according to claim 3, wherein the liquid crystal display panel comprises a plurality of display pixels arranged in the display area, and the black matrix is provided with a second opening corresponding to the display pixel;

the plurality of insulating layers further comprise a color resist layer disposed at the first opening and the second opening, and an absolute value of a difference in refractive indices between the color resist layer and an adjacent insulating layer thereof is greater than or equal to the first preset threshold;

the infrared light-transmitting layer is arranged between the color resist layer and the first substrate, or the infrared light-transmitting layer is arranged between the color resist layer and the protective layer.

5. The liquid crystal display panel according to claim 4, wherein in the display area, the color resist layer comprises a plurality of color resist blocks corresponding to colors of display pixels;

in the functional area, the color resist layer comprises at least two stacked layers of color resist sub-layers with different colors passing through, an absolute value of a difference in refractive indices of the color resist sub-layers with different colors passing through is less than or equal to a second preset threshold, and the second preset threshold is less than the first preset threshold.

6. The liquid crystal display panel according to claim 3, wherein the infrared light-transmitting layer comprises a first inorganic layer and a second inorganic layer that are stacked;

an absolute value of a difference in refractive indices between the first inorganic layer and an adjacent insulating layer thereof is greater than or equal to the first preset threshold;

an absolute value of a difference in refractive indices between the second inorganic layer and an adjacent insulating layer thereof is greater than or equal to the first preset threshold.

7. The liquid crystal display panel according to claim 2, wherein in the color filter substrate, the plurality of insulating layers further comprise a high resistance layer disposed on a side of the first substrate away from the protective layer;

the high resistance layer comprises a first high resistance area located in the functional area and a second high resistance area located in the display area, refractive indices of the high resistance layer in the first high resistance area and the second high resistance area are different;

an absolute value of a difference between the refractive index of the high resistance layer in the first high resistance area and the refractive index of the first substrate is greater than or equal to the first preset threshold;

an absolute value of a difference between the refractive index of the high resistance layer in the second high resistance area and the refractive index of the first substrate is greater than or equal to a second preset threshold, and the second preset threshold is less than the first preset threshold.

8. The liquid crystal display panel according to claim 7, wherein the liquid crystal display panel further comprises a first polarizer arranged on a side of the array substrate away from the color filter substrate and a second polarizer arranged on a side of the color filter substrate away from the array substrate;

the high resistance layer is disposed between the first substrate and the second polarizer.

9. The liquid crystal display panel according to claim 1, wherein in the array substrate, the plurality of insulating layers comprise a second substrate and a passivation layer, in at least one of a side of the second substrate close to the passivation layer and a side of the second substrate away from the passivation layer, a number of reflective interfaces formed by adjacent insulating layers with different refractive indices located in the functional area is greater than a number of reflective interfaces formed by adjacent insulating layers with different refractive indices located in the display area.

10. The liquid crystal display panel according to claim 9, wherein the array substrate further comprises a metal conductive layer, the metal conductive layer is provided with a corresponding third opening in the functional area, and the third opening at least covers the functional area.

11. The liquid crystal display panel according to claim 10, wherein in the array substrate, the plurality of insulating layers further comprise a buffer layer, a gate insulating layer, and an interlayer insulating layer that are sequentially stacked between the second substrate and the passivation layer, the buffer layer extends from the display area to the functional area, the gate insulating layer extends from the display area to the functional area, and the interlayer insulating layer extends from the display area to the functional area;

the metal conductive layer comprises a first electrode layer and a second electrode layer disposed on both sides of the passivation layer, and the passivation layer is in direct contact with a planarization layer in the functional area.

12. A vehicle-mounted liquid crystal display device, comprising:

a liquid crystal display panel comprising a display area and a functional area configured to transmit infrared light, wherein the liquid crystal display panel comprises an array substrate and a color filter substrate, the array substrate comprises a plurality of insulating layers, the color filter substrate is arranged opposite to the array substrate and comprises a plurality of insulating layers, wherein in the array substrate and/or the color filter substrate, a number of reflective interfaces formed by adjacent insulating layers of different refractive indices located in the functional area is greater than a number of adjacent reflective interfaces with different refractive indices located in the display area, and an absolute value of a difference in refractive indices of adjacent insulating layers on both sides of the reflective interface is greater than or equal to a first preset threshold;

an infrared camera arranged on a side of the array substrate away from the color filter substrate, and the infrared camera arranged on the functional area.

13. The vehicle-mounted liquid crystal display device according to claim 12, wherein in the color filter substrate, the plurality of insulating layers comprise a first substrate and a protective layer, in at least one of a side of the first substrate close to the protective layer and a side of the first substrate away from the protective layer, a number of reflective interfaces formed by adjacent insulating layers of different refractive indices located in the functional area is greater than a number of reflective interfaces formed by adjacent insulating layers of different refractive indices located in the display area.

14. The vehicle-mounted liquid crystal display device according to claim 13, wherein the color filter substrate further comprises a black matrix arranged between the first substrate and the protective layer, the black matrix is provided with a corresponding first opening in the functional area, and the first opening covers at least the functional area;

in the color filter substrate, the plurality of insulating layers further comprises an infrared light-transmitting layer disposed in the functional area and located between the first substrate and the protective layer, an absolute value of a difference in refractive indices between the infrared light-transmitting layer and an adjacent insulating layer thereof is greater than or equal to the first preset threshold.

15. The vehicle-mounted liquid crystal display device according to claim 14, wherein the liquid crystal display panel comprises a plurality of display pixels arranged in the display area, and the black matrix is provided with a second opening corresponding to the display pixel;

the plurality of insulating layers further comprise a color resist layer disposed at the first opening and the second opening, and an absolute value of a difference in refractive indices between the color resist layer and an adjacent insulating layer thereof is greater than or equal to the first preset threshold;

the infrared light-transmitting layer is arranged between the color resist layer and the first substrate, or the infrared light-transmitting layer is arranged between the color resist layer and the protective layer.

16. The vehicle-mounted liquid crystal display device according to claim 15, wherein in the display area, the color resist layer comprises a plurality of color resist blocks corresponding to colors of display pixels;

in the functional area, the color resist layer comprises at least two stacked layers of color resist sub-layers with different colors passing through, an absolute value of a difference in refractive indices of the color resist sub-layers with different colors passing through is less than or equal to a second preset threshold, and the second preset threshold is less than the first preset threshold.

17. The vehicle-mounted liquid crystal display device according to claim 14, wherein the infrared light-transmitting layer comprises a first inorganic layer and a second inorganic layer that are stacked;

an absolute value of a difference in refractive indices between the first inorganic layer and an adjacent insulating layer thereof is greater than or equal to the first preset threshold;

an absolute value of a difference in refractive indices between the second inorganic layer and an adjacent insulating layer thereof is greater than or equal to the first preset threshold.

18. The vehicle-mounted liquid crystal display device according to claim 13, wherein in the color filter substrate, the plurality of insulating layers further comprise a high resistance layer disposed on a side of the first substrate away from the protective layer;

the high resistance layer comprises a first high resistance area located in the functional area and a second high resistance area located in the display area, refractive indices of the high resistance layer in the first high resistance area and the second high resistance area are different;

an absolute value of a difference between the refractive index of the high resistance layer in the first high resistance area and the refractive index of the first substrate is greater than or equal to the first preset threshold;

an absolute value of a difference between the refractive index of the high resistance layer in the second high resistance area and the refractive index of the first substrate is greater than or equal to a second preset threshold, and the second preset threshold is less than the first preset threshold.

19. The vehicle-mounted liquid crystal display device according to claim 18, wherein the liquid crystal display panel further comprises a first polarizer arranged on a side of the array substrate away from the color filter substrate and a second polarizer arranged on a side of the color filter substrate away from the array substrate;

the high resistance layer is disposed between the first substrate and the second polarizer.

20. The vehicle-mounted liquid crystal display device according to claim 12, wherein in the array substrate, the plurality of insulating layers comprise a second substrate and a passivation layer, in at least one of a side of the second substrate close to the passivation layer and a side of the second substrate away from the passivation layer, a number of reflective interfaces formed by adjacent insulating layers with different refractive indices located in the functional area is greater than a number of reflective interfaces formed by adjacent insulating layers with different refractive indices located in the display area.

* * * * *